US011347485B1

(12) United States Patent
Brossard et al.

(10) Patent No.: US 11,347,485 B1
(45) Date of Patent: May 31, 2022

(54) SECURE, SCALABLE, TABLE-VALUED FUNCTIONS IN A CLOUD DATABASE

(71) Applicant: Snowflake Inc., Bozeman, MT (US)

(72) Inventors: Elliott Brossard, Kirkland, WA (US); Istvan Cseri, Seattle, WA (US); Derek Denny-Brown, Seattle, WA (US); Filip Drozdowski, Seattle, WA (US); Isaac Kunen, Seattle, WA (US); Edward Ma, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/389,937

(22) Filed: Jul. 30, 2021

Related U.S. Application Data

(60) Provisional application No. 63/197,799, filed on Jun. 7, 2021.

(51) Int. Cl.
*G06F 9/44* (2018.01)
*G06F 8/41* (2018.01)
*G06F 16/22* (2019.01)
*G06F 8/30* (2018.01)

(52) U.S. Cl.
CPC .............. *G06F 8/437* (2013.01); *G06F 8/315* (2013.01); *G06F 8/433* (2013.01); *G06F 16/2291* (2019.01)

(58) Field of Classification Search
CPC ...................................... G06F 8/315
USPC ......................................... 717/108
See application file for complete search history.

(56) References Cited

U.S. PATENT DOCUMENTS

| 8,112,408 | B2* | 2/2012 | Chen ..................... G06F 9/4484 707/706 |
| 8,639,717 | B2* | 1/2014 | Fish .................. G06F 16/24553 707/769 |
| 8,682,912 | B2* | 3/2014 | Fish .................... G06F 21/6227 707/754 |
| 9,355,145 | B2* | 5/2016 | George ............ G06F 16/24534 |
| 10,628,244 | B1* | 4/2020 | Cseri ....................... G06F 9/548 |
| 10,936,592 | B2* | 3/2021 | Chen ..................... G06F 16/21 |
| 10,970,265 | B2* | 4/2021 | Franz .................. G06F 16/2282 |
| 11,126,484 | B2* | 9/2021 | Cseri ................... G06F 16/2448 |
| 11,138,192 | B1* | 10/2021 | Chintala ............. H04L 63/0846 |
| 11,151,134 | B2* | 10/2021 | Chaudhry ......... G06F 16/24547 |
| 2006/0143167 | A1 | 6/2006 | Fish et al. |

(Continued)

OTHER PUBLICATIONS

"U.S. Appl. No. 17/390,344 Preliminary Amendment filed Aug. 2, 2021", 13 pages.

(Continued)

*Primary Examiner* — Francisco J Aponte
(74) *Attorney, Agent, or Firm* — Schwegman Lundberg & Woessner, P.A.

(57) ABSTRACT

A system comprises at least one hardware processor and a memory storing instructions. When executed, the instructions cause the at least one hardware processor to perform operations comprising receiving, in a compiling process, a request to create a Java user-defined table function (Java UDTF), the Java UDTF including code related to receiving one or more input tables and transforming the one or more input tables to an output table; verifying a construct of the Java UDTF in the request is correct; and compiling to generate execution code that includes the Java UDTF when the construct of the Java UDTF is correct.

17 Claims, 8 Drawing Sheets

(56) References Cited

U.S. PATENT DOCUMENTS

| | | | |
|---|---|---|---|
| 2006/0167850 A1 | 7/2006 | Fish et al. | |
| 2007/0038658 A1 | 2/2007 | Ghosh | |
| 2009/0177559 A1* | 7/2009 | Kim | G06Q 10/087 705/28 |
| 2012/0130963 A1* | 5/2012 | Luo | G06F 16/2443 707/693 |
| 2012/0191642 A1* | 7/2012 | George | G06F 16/24542 707/602 |
| 2012/0191732 A1* | 7/2012 | George | G06F 16/283 707/755 |
| 2012/0239612 A1* | 9/2012 | George | G06F 16/254 707/602 |
| 2013/0138626 A1* | 5/2013 | Delafranier | G06F 16/2453 707/713 |
| 2013/0254238 A1* | 9/2013 | Yan | G06F 16/90 707/793 |
| 2015/0032774 A1 | 1/2015 | Cichosz et al. | |
| 2015/0220597 A1* | 8/2015 | Simhadri | G06F 16/24534 707/797 |
| 2016/0125023 A1* | 5/2016 | Plasek | G06F 16/2393 707/747 |
| 2016/0342653 A1* | 11/2016 | Chen | G06F 16/24532 |
| 2017/0161266 A1* | 6/2017 | Chen | G06F 16/24 |
| 2018/0081947 A1 | 3/2018 | Kass | |
| 2018/0203898 A1 | 7/2018 | Aldrich et al. | |
| 2018/0329952 A1* | 11/2018 | Ramachandra | G06F 16/90335 |
| 2019/0102426 A1* | 4/2019 | Chaudhry | G06F 16/24537 |
| 2019/0197156 A1* | 6/2019 | Yuan | G06F 8/427 |
| 2019/0243833 A1* | 8/2019 | Aldrich | G06F 16/24542 |
| 2019/0362067 A1 | 11/2019 | Salehpour et al. | |
| 2020/0004750 A1* | 1/2020 | Aldrich | G06F 16/24542 |
| 2021/0303371 A1 | 9/2021 | Wang et al. | |

OTHER PUBLICATIONS

"U.S. Appl. No. 17/390,344, Non Final Office Action dated Nov. 9, 2021", 23 pgs.
"U.S. Appl. No. 17/390,344, Examiner Interview Summary dated Jan. 28, 2022", 2 pgs.
"U.S. Appl. No. 17/390,344, Response filed Feb. 9, 2022 to Non Final Office Action dated Nov. 9, 2021", 8 pgs.

* cited by examiner

SECURE, SCALABLE, TABLE-VALUED FUNCTIONS IN A CLOUD DATABASE

CLAIM OF PRIORITY

This Application claims the benefit of priority to U.S. Provisional Application Ser. No. 63/197,799, filed Jun. 7, 2021, which is hereby incorporated by reference herein in its entirety.

TECHNICAL FIELD

Embodiments of the disclosure relate generally to a network-based database system or a cloud data platform and, more specifically, to facilitating creation and use of user-defined table-valued functions in a Java environment.

BACKGROUND

Cloud-based data warehouses and other database systems or data platforms sometimes provide support for user-defined functions that enable such systems to perform operations that are not available through the built-in, system-defined functions. However, user-defined table-valued functions are not always supported.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In computer programming, a user-defined function (UDF) is a computer executable function created by a user of a computer program or computer environment for a specific need for the user, rather than a function that is a standard function provided by the computer program language or environment. A UDF includes user-provided code that performs computing operations or invokes code-based functions related to a database query. There are typically four kinds of user-defined functions: functions that have no arguments as inputs and return no value to the executing computer program, functions with no arguments as inputs that return a value, functions with arguments as inputs and return no value, and functions with arguments as inputs and return a value.

However, computer programming environments do not typically support user-defined functions that receive a table of data as input and return one or more tables of data to the executing computer program (i.e., user-defined table functions, or UDTFs). Additionally, executing a UDTF that operates on a large amount of input data (e.g., data from a data warehouse, data lake, etc.) may generate a large amount of output data that would consume the memory resources of the computer system executing the UDTF.

Aspects of the present disclosure address the above by providing a computer environment that enables a user to create a Java UDTF. Because Java is a statically-typed language, the computer environment verifies the correctness of UDTFs as they are created, rather than when the user attempts to execute them.

Figure 1:
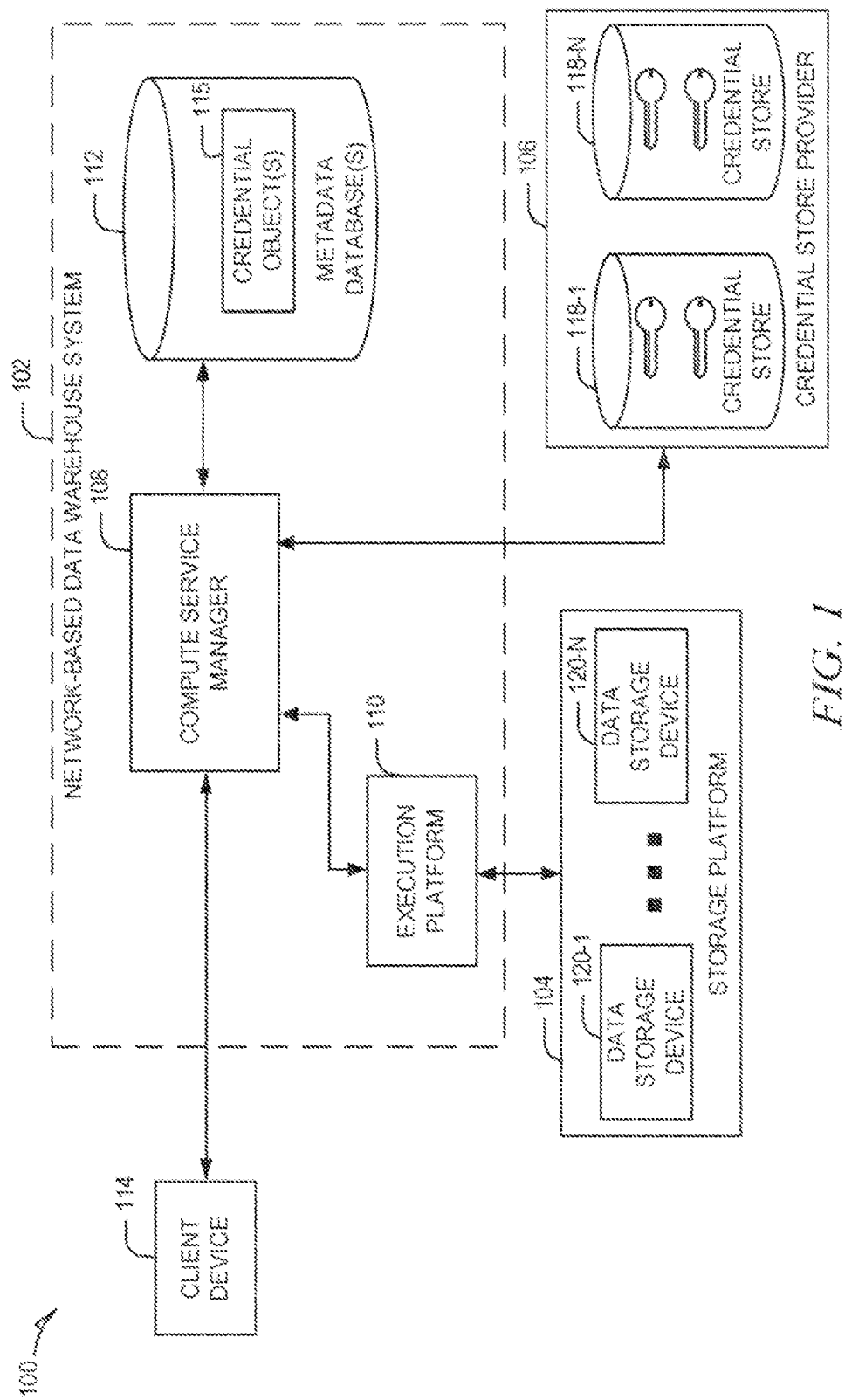
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage), and a cloud credential store provider 106. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102. A database warehouse is a relational database that is designed for analytical rather than transactional work. A data warehouse collects and aggregates data from one or many sources and serves as a repository for all or certain data sets collected by an operational system, such as an operational system of a business for example.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
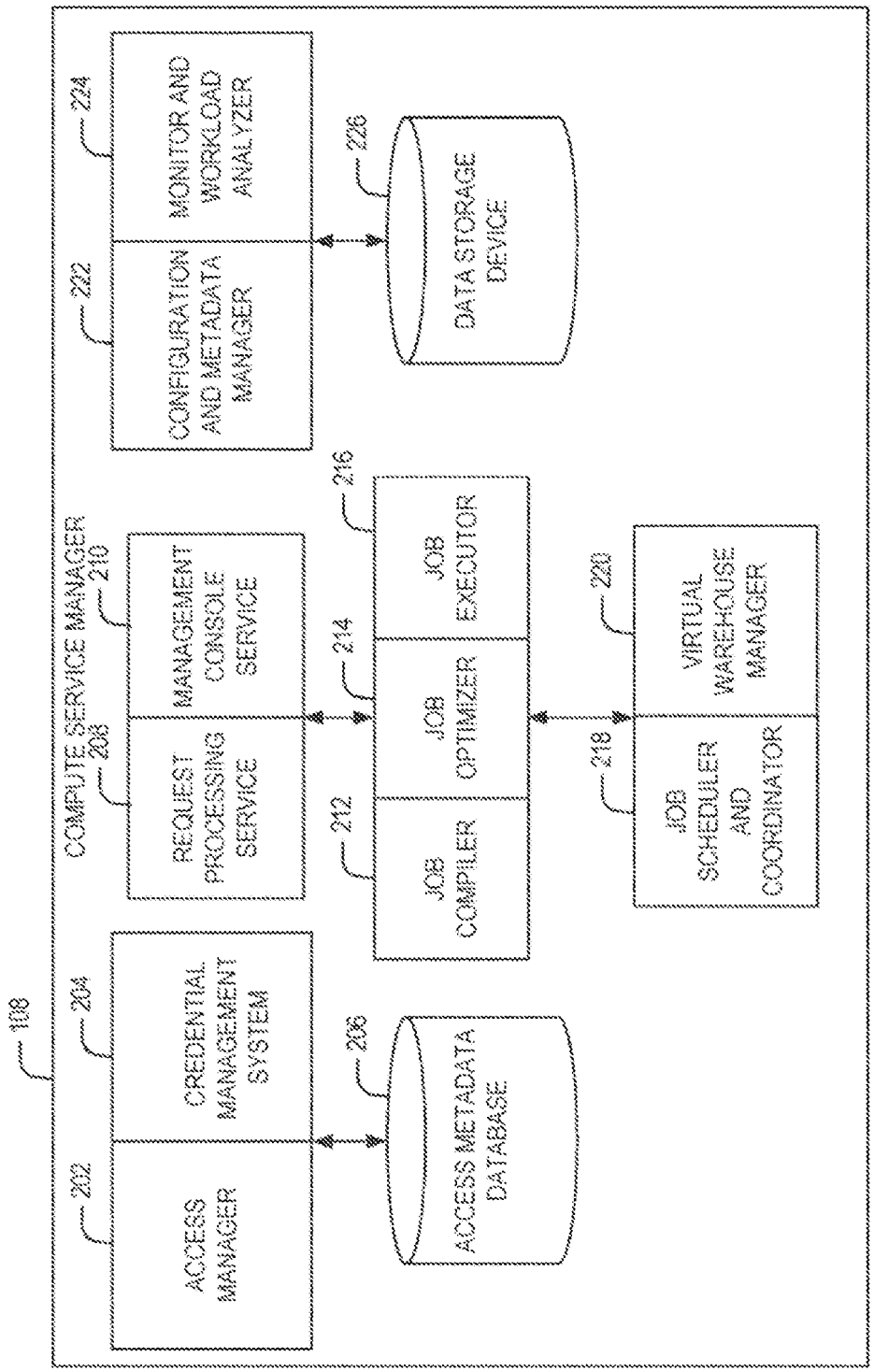
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
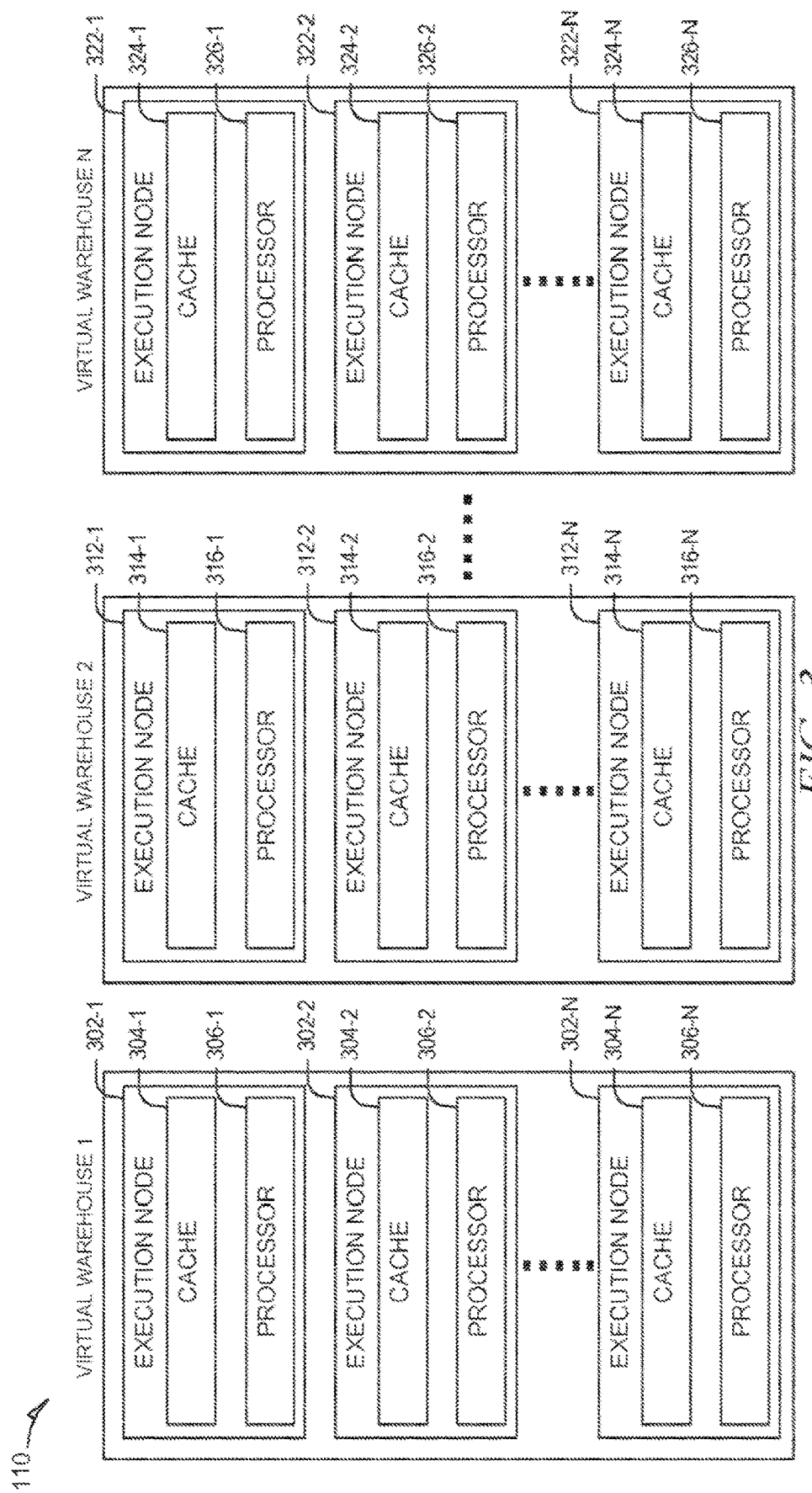
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-n includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
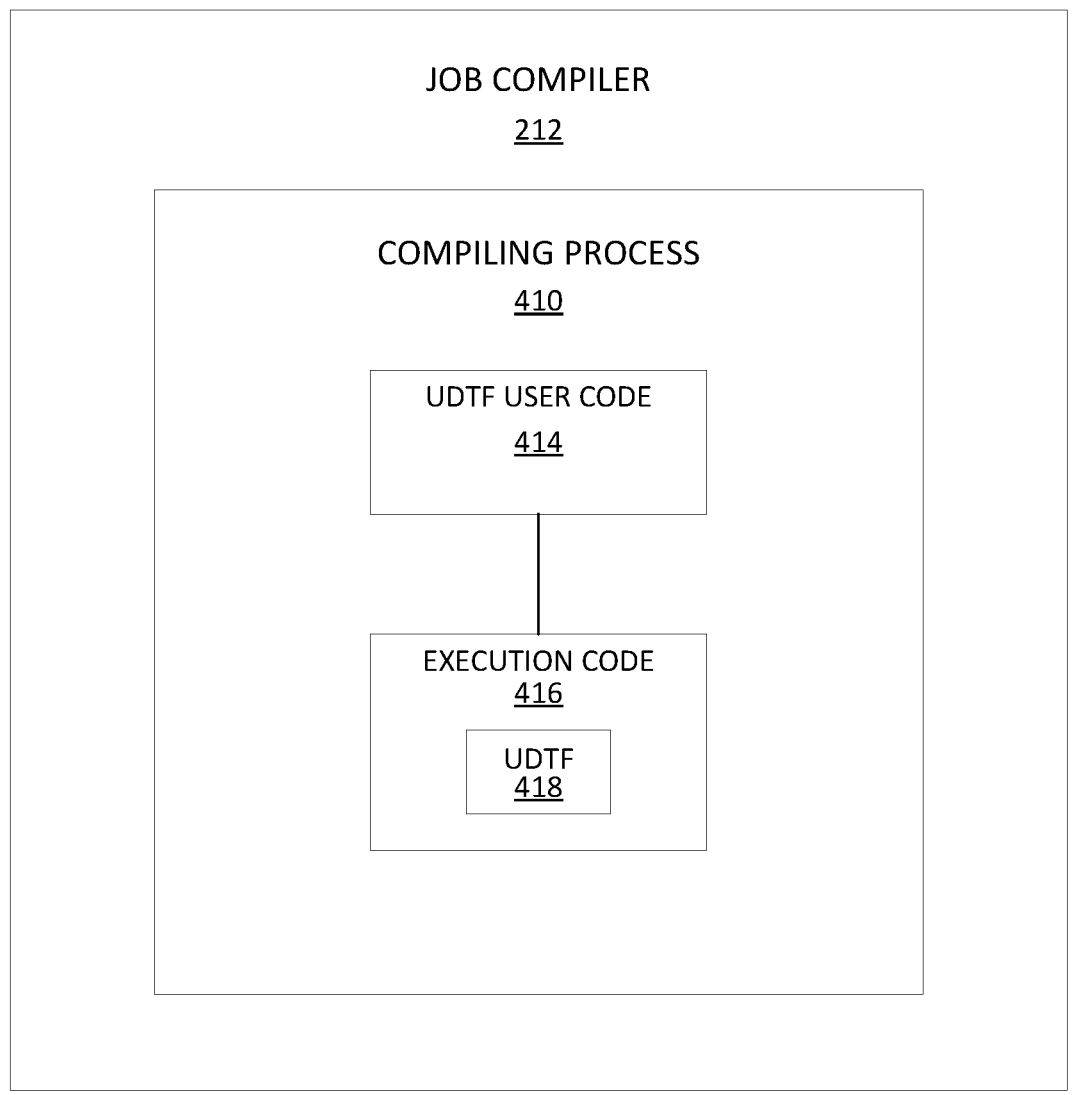
FIG. 4 is a computing environment conceptually illustrating an example software architecture for compiling user code of a user-defined table function (UDTF) by a compiling process running on a job compiler, in accordance with some embodiments of the present disclosure.

FIG. 4 is a computing environment 400 conceptually illustrating an example software architecture for compiling user code of a UDTF by a compiling process running on a job complier (e.g., the job compiler 212 of the compute service manager 108 of FIG. 2), in accordance with some embodiments of the present disclosure. The job compiler 212 includes a compiling process 410 to generate execution code 416 from user program code. The term "compiling process" can refer to an instance of a computer program that executes to convert user-provided computer program instructions into machine-executable code or execution code.

During the compiling process 410, a request is received to create a UDTF written by a user in Java (Java UDTF). The Java UDTF 414 includes user-written code related to receiving one or more input tables and transforming the input tables into an output table. The compiling process 410 of the job complier 212 verifies that the construct of the user's Java UDTF is correct and compiles execution code 416 that includes the executable Java UDTF 418 when the construct of the user's Java UDTF is correct.

For example, the input table to the UDTF and the output table have rows and columns. The request to create the Java UDTF may specify a Java class of an output row of the output table. The job complier 212 verifies that the class of the output row is correct as part of the compiling process. In another example, the job compiler 212 verifies that a constructor of an input row of an input table expects a specified number of arguments for initialization, and that public data members of the output row class are consistent with the names and types of the output columns during the compiling.

An example of user code to create a UDTF is shown below:
    CREATE FUNCTION <function name>([<arguments>])
    RETURNS TABLE (<output_col_name> <ouput_col_type>
       [,<output_col_name> <ouput_col_type> . . . ])
    LANGUAGE JAVA
    IMPORTS=(<imports>)
    HANDLER=<handler_path>;

The request to CREATE FUNCTION specifies JAVA as the programming language and indicates that an output table is returned to the computer process executing the execution code (generated by the job complier) that includes the UDTF function. The job complier verifies that a specified number of <arguments> is expected, and that and that public data members of the output row class are consistent with the <output_col_name> <ouput_col_type> pairs. Because Java is a statically typed computer language (rather than dynamically typed), the correctness of the Java UDTF can be verified during creation (e.g., compiling) rather than during execution. A Java interface can be provided for the user to validate their class representing a row is correct before the execution code is uploaded for running.

In the user code example above, <imports> is a comma-separated list of stage-relative import paths (e.g., '@stage/classes.jar'), which can be Java Archives (JARS) or other types of files that should be made available to the UDTF. A user provides a Java class as the "handler" for their UDTF. The <handler_path> is a string with a Java package-qualified name of the class that implements the UDTF (e.g., 'com.mycompany.MyUdtf'). The handler provides an output row class type through the static getOutputClass accessor, whose public data members correspond to by case-insensitive name matching to output columns of the table output by the UDTF. The handler may provide a zero-argument constructor, which can be invoked for each partition processed by the UDTF. The constructor may perform any one-time initialization that is needed prior to processing rows.

The handler also provides a process method, which takes some number of input arguments in correspondence with the number of columns of the table input to the UDTF and returns a stream of the output row type before the complete output table is determined. Because a user-written Java UDTF for a data warehouse application may emit many output rows of data for each input row of data, the streaming technique allows the output rows to be emitted in small batches that won't overtax the system resources when the streaming is executed by a computing process, and the size of the streamed batches can be optimized for efficient use of memory and the network.

The process method may include valid structured query language to Java (SQL-Java) type mappings for the input arguments that are bound positionally between SQL and Java. The process method may be invoked for each input row of the input partition. The stream may return any number of output rows including zero output rows. Returning a null stream in the process may cause the process method to stop although endPartition can still be called if it is defined in the UDTF. If the process method throws an exception, the process will stop and the query will fail with an error. The handler may also provide an endPartition method, which takes no input but returns a stream of output row type. The rows returned from an endPartition method are not associated with any input row of the input table.

As an example, a user may define the output row class type shown below.

```
class OutputRow{
    public int result;
    public OutputRow (int Result){
        this.result=result;
    }
}
```

The Java UDTF framework reads the contents of the OutputRow using public data members that correspond with the names of the output columns. The matching is case-insensitive. The name "result" should match the name of the output column in the table declaration. The user may also define a handler class as:

```
class JavaUdtfHandler {
    public static Class getOutputClass( ) {
    return OutputRow.class
}
    public Stream<OutputRow> process(int x, int y) {
    return Stream.of(new OutputRow(x+y));
}
```

This UDTF emits the sum of the two input columns as the output column. The special stream mechanism can output zero or more output rows. The stream mechanism below can be used to emit extra rows.

```
    public Stream<OutputRow> endPartition( ) {
    return Stream.of(new OutputRow(1), OutputRow(2), OutputRow(3));
}
```

Adding this special stream mechanism returns three extra output rows that are not associated with any input rows.

Below is an example of a Java interface for a user to compile user code against to ensure their code is correct as well as provide a test harness for the code.

```
interface JavaUdtfInterface {
    public Class getOutputClass( );
    public Stream<Output> endPartition( );
}
```

The test harness verifies that the type constructor of the input row expects some particular number of arguments, and that the output tow type has the right public data members.

Figure 5:
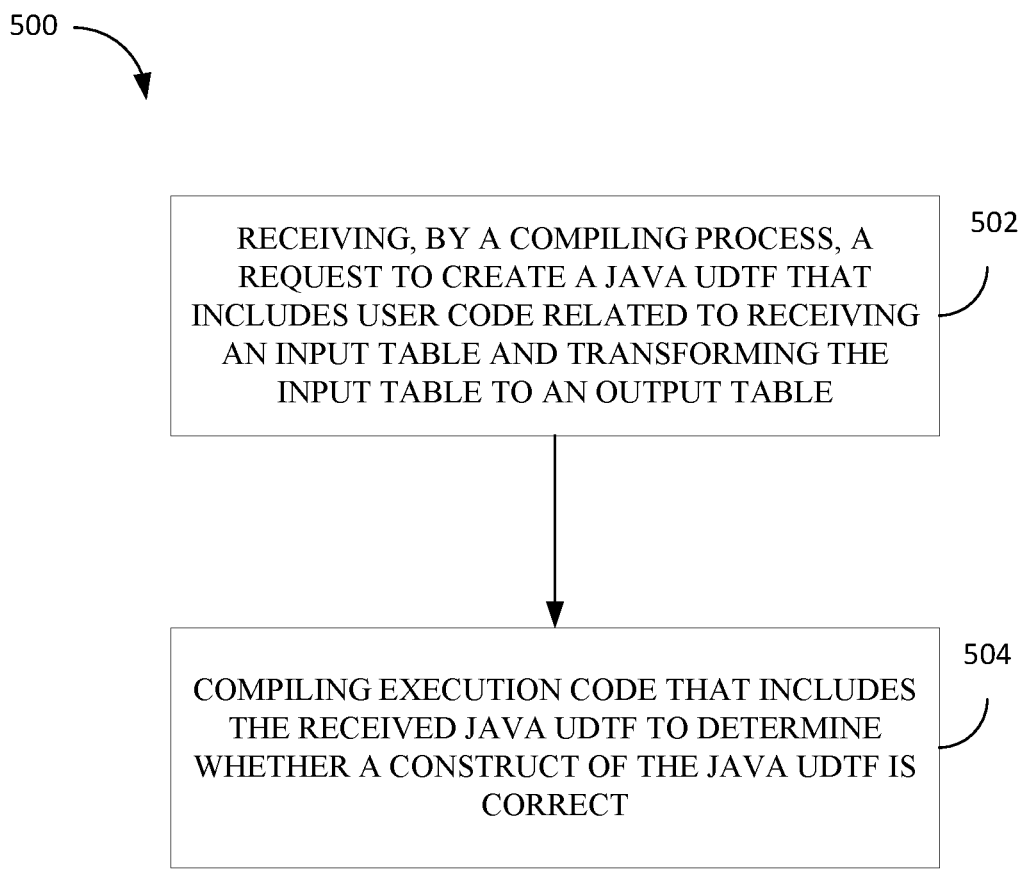
FIG. 5 is flow diagram illustrating operations of a database system in performing a method for compiling user code of a Java UDTF by a compiling process running on the job compiler, in accordance with some embodiments of the present disclosure.

FIG. 5 is a flow diagram illustrating operations of a job complier (e.g., job compiler 212 of compute service manager 108 in FIG. 2) in performing a method 500 for compiling a Java UDTF in accordance with some embodiments of the present disclosure. The method 500 may be embodied in computer-readable instructions for execution by one or more hardware components (e.g., one or more processors) such that the operations of the method 500 may be performed by components of network-based data warehouse system 102, such as components of the compute service manager 108.

At 502, the compiling process executing on the job compiler receives a request to create the Java UDTF. The Java UDTF includes user code related to receiving an input table and transforming the input table to an output table. At 504, the job complier compiles execution code that includes the Java UDTF. The compiler determines whether the construct of the Java UDTF is correct. This determines correctness of the user's UDTF before the execution code is loaded for executing.

The user-defined Java UDTFs can be executed in a sandbox environment. In computer security, a sandbox (e.g., sandbox environment) is a security mechanism for separating running programs, usually in an effort to mitigate system failures or software vulnerabilities from spreading. A sandbox can be used to execute untested or untrusted programs or code, possibly from unverified or untrusted third parties, suppliers, users or websites, without risking harm to the host machine or operating system. A sandbox can provide a tightly controlled set of resources for guest programs to run in, such as storage and memory scratch space. Network access, the ability to inspect the host system or read from input devices can be disallowed or restricted.

Existing approaches to sandbox environments in database systems may not adequately provide security mechanisms during execution of code in a given user-defined function (UDTF). As a result, existing approaches may leave database systems more vulnerable to breaches in system integrity. Moreover, executing arbitrary code by a malicious actor can lead to compromises in memory and data utilized by such database systems. In an example, malicious code may be able to successfully circumvent security measures by improperly or insufficiently configured sandbox environments, which may only provide a single layer of security. In another example, such database systems may not utilize a sandbox environment altogether, and instead utilize a security policy (e.g., configuration file or set of ad-hoc rules) that is reliant on a (singular) particular system component (e.g., a security manager) to enforce.

Figure 6:
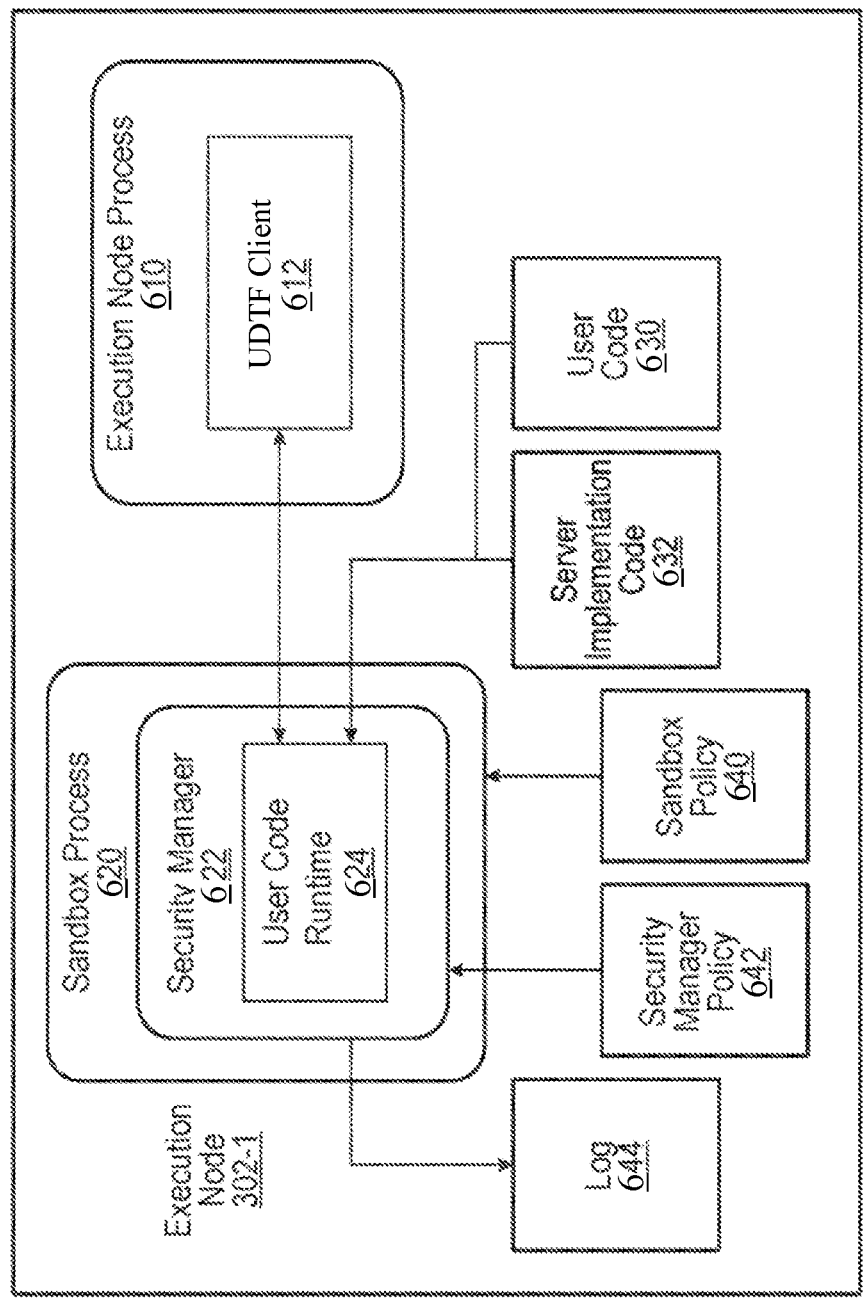
FIG. 6 is a computing environment conceptually illustrating an example software architecture executing a Java UDTF by a process running on a given execution node of an execution platform, in accordance with some embodiments of the present disclosure

FIG. 6 is a computing environment 600 conceptually illustrating an example software architecture executing a user-defined function (UDTF) by a process running on a given execution node of the execution platform 110, in accordance with some embodiments of the present disclosure.

As illustrated, the execution node 302-1 from the execution platform 110 includes an execution node process 610, which in an embodiment is running on the processor 306-1 and can also utilize memory from the cache 304-1 (or another memory device or storage). The term "execution node process" or "computing process" can refer to an instance of a computer program that is being executed by one or more threads by an execution node or execution platform.

As mentioned previously herein, the compute service manager 108 validates all communication from the execution platform 110 to validate that the content and context of that communication are consistent with the task(s) known to be assigned to the execution platform 110. For example, the execution platform 110 executing a query A is not allowed to request access to a particular datasource (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 644 or other location). Further, the information stored on a given execution node is restricted to data relevant to the current query and any other data is unusable by destruction or encryption where the key is unavailable.

The execution node process 610 is executing a UDTF Client 612 in the example of FIG. 6. The UDTF client 612 is implemented to support UDTFs written in Java. User code 630 may be provided as a package e.g., in the form of a JAR file which includes code for one or more UDTFs. Server implementation code 632, in an embodiment, is a JAR file that initiates a server which is responsible for receiving requests from the execution node process 510, assigning worker threads to execute user code, and returning the results, among other types of server tasks.

In an implementation, an operation from a Java UDTF can be performed by a user code runtime 624 executing within a sandbox process 620 (described further below). In an embodiment, the user code runtime 624 is implemented as a virtual machine, such as a JAVA virtual machine (JVM). Because the user code runtime 624 advantageously executes in a separate process relative to the execution node process 610, there is a lower risk of manipulating the execution node process 610. Results of performing the operation, among other types of information or messages, can be stored in a log 644 for review and retrieval. In an embodiment, the log 644 can be stored locally in memory at the execution node 302-1, or at a separate location such as the storage platform 104. Moreover, such results can be returned from the user code runtime 624 to the UDTF client 612 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDTF client 612 uses a data transport mechanism that supports a network transfer of columnar data between the user code runtime 524 (and vice-versa) with the aforementioned advantages described above.

Security Manager 622, in an example, can prevent completion of an operation from a given UDTF by throwing an exception (e.g., if the operation is not permitted), or returns (e.g., doing nothing) if the operation is permitted. In an implementation, the Security Manager 622 is implemented as a Java security manager object that allows applications to implement a security policy such as a security manager policy 642, and enables an application to determine, before performing a possibly unsafe or sensitive operation, what the operation is and whether it is being attempted in a security context that allows the operation to be performed. The security manager policy 642 can be implemented as a file with permissions that the user code runtime 624 is granted. The application (e.g., UDTF executed by the user code runtime 624) therefore can allow or disallow the operation based at least in part on the security policy.

Sandbox process 620, in an embodiment, is a sub-process (or separate process) from the execution node process 610. A sub-process, in an embodiment, refers to a child process of a given parent process (e.g., in this example, the execution node process 610). The sandbox process 620, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 620 is a lightweight process in comparison to the execution node process 610 and is optimized (e.g., closely coupled to security mechanisms of a given operating system kernel) to process a database query in a secure manner within the sandbox environment.

In an embodiment, the sandbox process 620 can utilize a virtual network connection in order to communicate with other components within the subject system. A specific set of rules can be configured for the virtual network connection with respect to other components of the subject system. For example, such rules for the virtual network connection can be configured for a particular UDTF to restrict the locations (e.g., particular sites on the Internet or components that the UDTF can communicate) that are accessible by operations performed by the UDTF. Thus, in this example, a process method of the UDTF, or a portion of the process method can be denied access to particular network locations or sites on the Internet. The denied access may generate an exception, but the computing process can continue to attempt to execute other portions of the process method.

The sandbox process 620 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and interprocess communication) that are not accessible to another group of processes (which may have access to a different group of resources not accessible by the former group of processes), other container implementations, and the like. By having the sandbox process 620 execute as a sub-process to the execution node process 610, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 620 can utilize a sandbox policy 640 to enforce a given security policy. The sandbox policy 640 can be a file with information related to a configuration of the sandbox process 620 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 620 restricts the memory and processor (e.g., CPU) usage of the user code runtime 624, ensuring that other operations on the same execution node can execute without running out of resources.

As mentioned previously herein, the sandbox process 620 is a sub-process (or separate process) from the execution node process 610, which in practice means that the sandbox process 620 resides in a separate memory space than the execution node process 610. In an occurrence of a security breach in connection with the sandbox process 620 (e.g., by errant or malicious code from a given UDTF), if arbitrary memory is accessed by a malicious actor, the data or information stored by the execution node process is protected.

Figure 7:
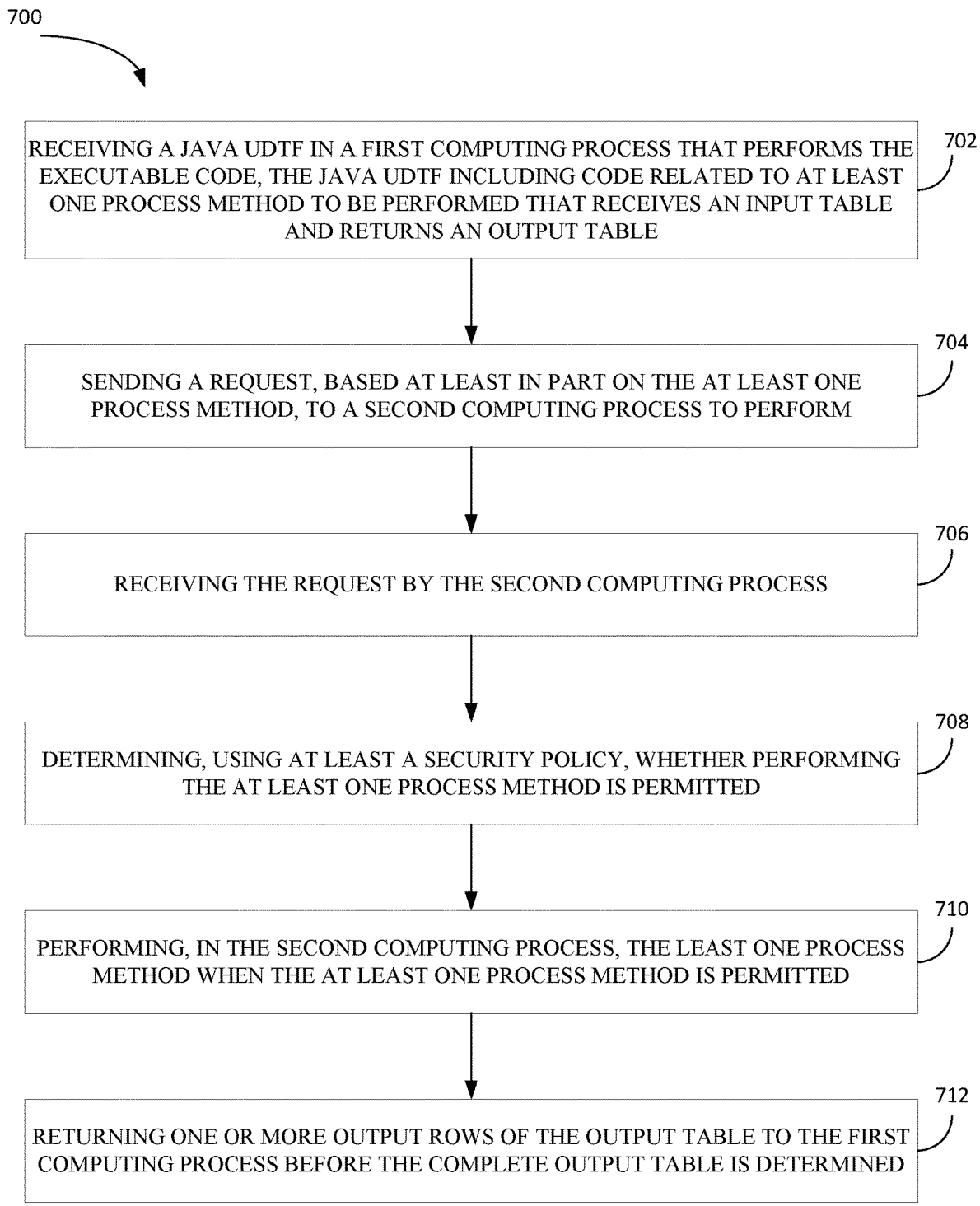
FIG. 7 is flow diagram illustrating operations of a database system in performing a method for executing a Java UDTF in a secure computing environment by a process running on a given execution node of the execution platform, in accordance with some embodiments of the present disclosure.

FIG. 7 is a flow diagram illustrating operations of a database system in performing a method for executing a Java UDTF in a secure computing environment by a process running on a given execution node of the execution platform 110, in accordance with some embodiments of the present disclosure. The method 700 may be embodied in computer-readable instructions for execution by one or more hardware components (e.g., one or more processors) such that the operations of the method 700 may be performed by components of network-based data warehouse system 102, such as components of the execution platform 110. Accordingly, the method 700 is described below, by way of example with reference thereto. However, it shall be appreciated that the method 700 may be deployed on various other hardware configurations and is not intended to be limited to deployment within the network-based data warehouse system 102.

At operation 702, the execution node 302-1 receives a Java UDTF in a first computing process (e.g., the execution node process 610 or computing process). The Java UDTF includes user code related to a process method to be performed that receives an input table and returns an output table. The process method takes input arguments and returns a stream of the output row of the output table.

At operation 704, the execution node 302-1 sends a request based at least in part on the process method to a second computing process (e.g., the sandbox process 620) to perform, the second computing process being different than the first computing process and comprising a sandbox for executing the at least one operation. The first computing process and the second computing process are executed on the same execution node of an execution platform (e.g., the execution platform 110). Alternatively, the first computing process and the second computing process can execute in different execution nodes of the execution platform as it is appreciated that embodiments described herein do not necessarily restrict the processes to execute on the same execution node. In an embodiment, a UDTF client (e.g., UDTF client 612) can send the request directly to a virtual machine (e.g., user code runtime 624) executing in the second computing process (e.g., sandbox process 620).

At operation 706, the second computing process of the execution node 302-1 receives the request. In an example, the second computing process can forward the request to a virtual machine (e.g., the user code runtime 624) for processing. In an embodiment, the request is sent directly to the virtual machine from the UDF client executing in the first computing process (e.g., the execution node process 610).

At operation 708, the execution node 302-1 determines, using at least a security policy (e.g., the security manager policy 642), whether performing the process method is permitted. In an embodiment, this can be determined by the security manager 622 using the security policy. Alternatively or conjunctively, the second computing process (e.g., sandbox process 620), using a sandbox policy (e.g., sandbox policy 640) can determine whether the operation is permitted. In an implementation, the operation is performed/executed, and subsequently the execution node 302-1 makes a determination whether the operation is permitted under one or both of the security policy and the sandbox policy. In an example where at least a portion of the operation is not permitted under a given policy, the execution node 302-1 can cease or abort the completion of the process method in progress, or if the operation has completed then perform steps to revert the process method. In this manner, the sandbox process 620 can provide multiple layers of security based on the security manager policy 642 and the sandbox policy 640.

At operation 710, the second computing process of the execution node 302-1 performs the process method in response to the operation being permitted. Alternatively, as described before, an exception (e.g., error notification or programmatically determined error message, and the like) can be returned instead if the operation is determined to not be permitted based on the security policy.

At operation 712, the second computing process of the execution node 302-1 returns one or more output rows of the output table to the first computing process (e.g., execution node process 610) before the complete output table is determined. In an embodiment, the virtual machine (e.g., user code runtime 624) executing in the sandbox process (e.g., the second computing process corresponding to sandbox process 620) can return the output rows directly to the UDTF client in the first computing process (e.g., execution node process 610). The output rows are then received by the first computing process (e.g., for additional processing).

Figure 8:
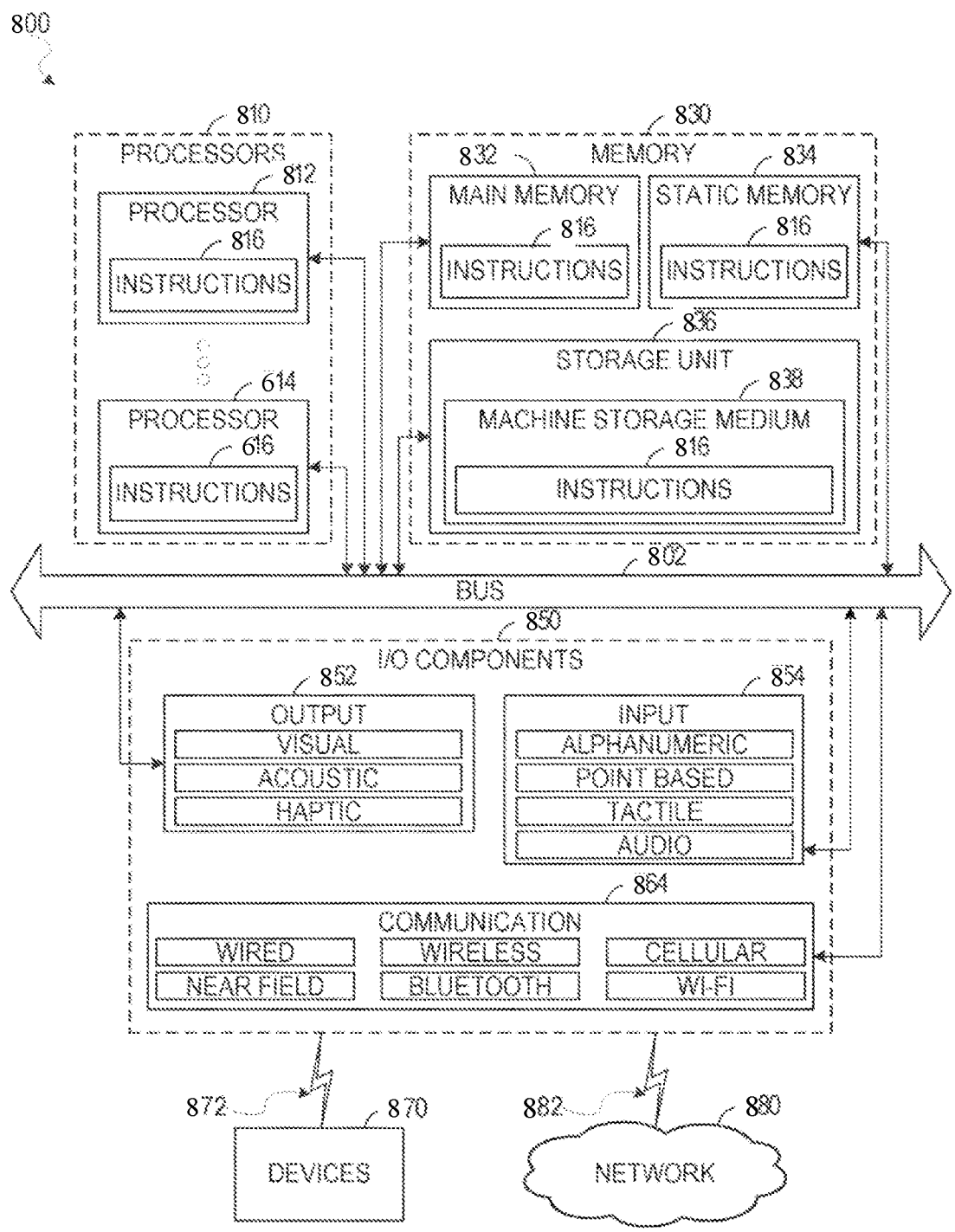
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the method 500 of FIG. 5 and the method 700 of FIG. 7. As another example, the instructions 816 may cause the machine 800 to implement portions of the data flows illustrated in FIG. 4 or FIG. 6. In this way, the instructions 816 transform a general, non-programmed machine into a particular machine 800 (e.g., the compute service manager 108 or a node in the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108 or the execution platform 110, and the devices 870 may include the client device 114 or any other computing device described herein as being in communication with the network-based data warehouse system 102 or the cloud storage platform 104.

EXECUTABLE INSTRUCTIONS AND MACHINE STORAGE MEDIUM

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Examples of Embodiments

Following is a list of some examples of embodiments described herein.

Example 1 includes subject matter (such as a system) comprising at least one hardware processor and a memory storing instructions that cause the at least one hardware processor to perform operations that include: receiving, in a compiling process, a request to create a Java user-defined table function (Java UDTF), the Java UDTF including code related to receiving one or more input tables and transforming the one or more input tables to an output table; verifying a construct of the Java UDTF in the request is correct; and compiling to generate execution code that includes the Java UDTF when the construct of the Java UDTF is correct.

In Example 2, the subject matter of Example 1 optionally includes receiving a request to create the Java UDTF that specifies a Java class of an output row of the output table; and the instructions cause the at least one hardware processor to verify that the class of the output row is correct as part of the compiling In Example 3 the subject matter of one or both of Examples 1 and 2 optionally includes instructions that cause the at least one hardware processor to verify that a constructor of input rows of the one or more input tables expects a specified number of arguments and that public data members of the Java class of the output row are consistent with names and types of output columns of the output table as the part of the compiling.

In Example 4, the subject matter of one or any combination of Examples 1-3 optionally includes receiving a request to create the Java UDTF that indicates Java as the programming language; and indicates that the output table is returned to a computing process executing the code that includes the Java UDTF.

In Example 5, the subject matter of one or any combination of Examples 1-4 optionally includes receiving a request to create the Java UDTF specifies a Java class type for an output row of the output table, wherein the specified Java class is included in a Java package.

In Example 6, the subject matter of one or any combination of Examples 1-5 optionally includes receiving a request to create the Java UDTF that specifies a process method that receives a number of input arguments in correspondence with a number of columns of the input table and returns a stream of output rows of the output table having Java class type, and the generated executable code for the Java UDTF causes a computing process executing the code to return the stream of the output rows before the complete output table is determined.

In Example 7, the subject matter of one or any combination of Examples 1-6 optionally includes receiving the Java UDTF in a first computing process that performs the executable code, wherein the Java UDTF includes code related to a process method to be performed that receives the one or more input tables and returns the output table; sending a request, based at least in part on the process method, to a second computing process to perform; receiving the request by the second computing process; determining, using at least a security policy, whether performing one or more portions of the process method are permitted; performing, in the second computing process, portions of the process method determined to be permitted; and returning one or more output rows of the output table produced by the process method to the first computing process before the complete output table is determined.

Example 8 includes subject matter (such as a method) comprising receiving, by a compiling process, a request to create a Java user-defined table function (Java UDTF), the received Java UDTF including program code related to receiving one or more input tables and transforming the input tables to an output table; and compiling the program code to generate execution code that includes the received Java UDTF to determine whether a construct of the Java UDTF is correct.

In Example 9, the subject matter of Example 8 optionally includes receiving, by a compiling process, a request to create a Java user-defined table function (Java UDTF), the received Java UDTF including program code related to receiving one or more input tables and transforming the input tables to an output table; and compiling the program code to generate execution code that includes the received Java UDTF to determine whether a construct of the Java UDTF is correct.

In Example 10, the subject matter of one or both of Examples 8 and 9 optionally includes verifying that a constructor of input rows of the one or more input tables uses a specified number of arguments and that public data members of the Java class of the output row of the output table are consistent with names and types of output columns of the output table as the part of the compiling.

In Example 11, the subject matter of one or any combination of Examples 8-10 optionally includes receiving, by a compiling process that compiles the executable code, a request to create the Java UDTF that specifies Java as the programming language and indicates that the output table is returned to a computing process executing the execution code of the Java UDTF.

In Example 12, the subject matter of one or any combination of Examples 8-11 optionally includes receiving, by a compiling process that compiles the executable code, a request to create the Java UDTF that specifies a Java class type for an output row of the output table, wherein the Java class is included in a Java package.

In Example 13, the subject matter of one or any combination of Examples 8-12 optionally includes receiving, by the compiling process, a request to create the Java UDTF that specifies a process method that receives a number of input arguments in correspondence with a number of columns of the one or more input tables and returns a stream of the output row Java class type; and returning, by a computing process performing execution code of the Java UDTF, the stream of the output row before the complete output table is determined.

In Example 14, the subject matter of one or any combination of Examples 8-13 optionally includes receiving the Java UDTF in a first computing process; performing a process method of the Java UDTF that receives an input table and returns an output table, sending a request, based at least in part on the process method, to a second computing process to perform; receiving, by the second computing process, the request; determining, using at least a security policy, whether performing one or more portions of the process method is permitted; performing, in the second computing process, portions of the process method determined to be permitted; and returning one or more output rows of the output table produced by the process method to the first computing process before the complete output table is determined.

Example 15 is a computer-readable storage medium including instructions that, when executed by one or more processors of a machine, configure the machine to perform operations comprising: receiving, in a compiling process, a request to create a Java user-defined table function (Java UDTF), the Java UDTF including program code related to receiving one or more input tables and transforming the one or more input tables to an output table; verifying a construct of the Java UDTF in the request is correct; and compiling the program code to generate execution code that includes the Java UDTF when the construct of the Java UDTF is correct.

In Example 16, the computer-readable storage medium of Example 15 optionally includes instructions that configure the machine to perform operations comprising: receiving a request to create the Java UDTF that specifies a Java class of an output row of the output table; and verifying that the class of the output row is correct as part of the compiling.

In Example 17, the computer-readable storage medium of one or both of Examples 15 and 16 optionally includes instructions that configure the machine to perform operations comprising verifying that a constructor of input rows of the one or more input tables expects a specified number of arguments, and verifying that public data members of a Java class of the output row are consistent with names and types of output columns of the output table as the part of the compiling.

In Example 18, the computer-readable storage medium of one or any combination of Examples 15-17 optionally includes instructions that configure the machine to perform operations comprising receiving a request to create the Java UDTF that indicates Java as the programming language and indicates that the output table is returned to a computing process performing execution code that includes the Java UDTF.

In Example 19, the computer-readable storage medium of one or any combination of Examples 15-18 optionally includes instructions that configure the machine to perform operations comprising receiving a request to create the Java UDTF that specifies a Java class type for an output row of the output table, wherein the Java class is specified in a Java package.

In Example 20, the computer-readable storage medium of one or any combination of Examples 15-19 optionally includes instructions that configure the machine to perform operations comprising receiving a request to create the Java UDTF that specifies a process method that receives a number of input arguments in correspondence with a number of columns of the input table and returns a stream output rows of the output table having a Java class type, and compiling executable code for the Java UDTF that causes a computing process performing the execution code to begin returning the stream of the output rows before the complete output table is determined.

These several Examples can be combined in any permutation or combination.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    a memory storing instructions that cause the at least one hardware processor to perform operations comprising:
    receiving, in a compiling process, a request to create a Java user-defined table function (Java UDTF), the Java UDTF including code related to receiving one or more input tables and transforming the one or more input tables to an output table;
    verifying a construct of the Java UDTF in the request is correct; and
    compiling to generate execution code that includes the Java UDTF when the construct of the Java UDTF is correct, wherein the compiling includes providing a test harness to verify that a type constructor of input rows of the one or more input tables expects a specified number of arguments and that public data members of the Java class of the output row are consistent with names and types of output columns of the output table.

2. The system of claim 1, wherein the request to create the Java UDTF specifies a Java class of an output row of the output table; and the instructions cause the at least one hardware processor to verify that the class of the output row is correct as part of the compiling.

3. The system of claim 1, wherein the request to create the Java UDTF indicates Java as the programming language; and indicates that the output table is returned to a computing process executing the code that includes the Java UDTF.

4. The system of claim 1, wherein the request to create the Java UDTF specifies a Java class type for an output row of the output table, wherein the specified Java class is included in a Java package.

5. The system of claim 4,
    wherein the request to create the Java UDTF specifies a process method that receives the specified number of arguments in correspondence with a number of columns of the input table and returns a stream of output rows of the output table having Java class type; and
    wherein executable code for the Java UDTF causes a computing process executing the code to return the stream of the output rows of the output table before a complete output table is determined.

6. The system of claim 1, including:
    receiving the Java UDTF in a first computing process that performs the executable code, wherein the Java UDTF includes code related to a process method to be performed that receives the one or more input tables and returns the output table;
    sending a request, based at least in part on the process method, to a second computing process to perform;
    receiving the request by the second computing process;
    determining, using at least a security policy, whether performing one or more portions of the process method are permitted;
    performing, in the second computing process, portions of the process method determined to be permitted; and
    returning one or more output rows of the output table produced by the process method to the first computing process before completely determining the output table.

7. A method comprising:
    receiving, by a compiling process, a request to create a Java user-defined table function (Java UDTF), the received Java UDTF including program code related to receiving one or more input tables and transforming the input tables to an output table; and
    compiling the program code to generate execution code that includes the received Java UDTF to determine whether a construct of the Java UDTF is correct, wherein the compiling includes providing a test harness to verify that a type constructor of input rows of the one or more input tables expects a specified number of arguments and that public data members of the Java class of the output row are consistent with names and types of output columns of the output table.

8. The method of claim 7, including:
    receiving, by the compiling process, a request to create the Java UDTF that specifies a Java class of an output row of the output table; and
    verifying that the Java class of the output row is correct as part of the compiling.

9. The method of claim 7, including receiving, by a compiling process that compiles the executable code, a request to create the Java UDTF that specifies Java as the programming language and indicates that the output table is returned to a computing process executing the execution code of the Java UDTF.

10. The method of claim 7, including receiving, by a compiling process that compiles the executable code, a request to create the Java UDTF that specifies a Java class type for an output row of the output table, wherein the Java class is included in a Java package.

11. The method of claim 10, including:
    receiving, by the compiling process, a request to create the Java UDTF that specifies a process method that receives the specified number of arguments in correspondence with a number of columns of the one or more input tables and returns a stream of the output row Java class type; and
    returning, by a computing process performing execution code of the Java UDTF, the stream of the output row before a complete output table is determined.

12. The method of claim 7, including:
    receiving the Java UDTF in a first computing process;
    performing a process method of the Java UDTF that receives an input table and returns an output table;
    sending a request, based at least in part on the process method, to a second computing process to perform;
    receiving, by the second computing process, the request;
    determining, using at least a security policy, whether performing one or more portions of the process method is permitted;
    performing, in the second computing process, portions of the process method determined to be permitted; and returning one or more output rows of the output table produced by the process method to the first computing process before completely determining the output table.

13. A non-transitory computer-readable storage medium including instructions that, when executed by one or more processors of a machine, configure the machine to perform operations comprising:

receiving, in a compiling process, a request to create a Java user-defined table function (Java UDTF), the Java UDTF including program code related to receiving one or more input tables and transforming the one or more input tables to an output table;

verifying a construct of the Java UDTF in the request is correct; and compiling the program code to generate execution code that includes the Java UDTF when the construct of the Java UDTF is correct, wherein the compiling includes providing a test harness to verify that a type constructor of input rows of the one or more input tables expects a specified number of arguments and that public data members of the Java class of the output row are consistent with names and types of output columns of the output table.

14. The non-transitory computer readable storage medium of claim 13, further including instructions that configure the machine to perform operations comprising:

receiving a request to create the Java UDTF that specifies a Java class of an output row of the output table; and verifying that the class of the output row is correct as part of the compiling.

15. The non-transitory computer readable storage medium of claim 13, further including instructions that configure the machine to perform operations comprising:

receiving a request to create the Java UDTF that indicates Java as the programming language and indicates that the output table is returned to a computing process performing execution code that includes the Java UDTF.

16. The non-transitory computer readable storage medium of claim 13, further including instructions that configure the machine to perform operations comprising:

receiving a request to create the Java UDTF that specifies a Java class type for an output row of the output table, wherein the Java class is specified in a Java package.

17. The non-transitory computer readable storage medium of claim 13, further including instructions that configure the machine to perform operations comprising:

receiving a request to create the Java UDTF that specifies a process method that receives the specified number of arguments in correspondence with a number of columns of the input table and returns a stream output rows of the output table having a Java class type; and compiling executable code for the Java UDTF that causes a computing process performing the execution code to begin returning the stream of the output rows before a complete output table is determined.

* * * * *